United States Patent
Yew et al.

(10) Patent No.: US 8,835,049 B2
(45) Date of Patent: Sep. 16, 2014

(54) NEGATIVE ACTIVE MATERIAL FOR A RECHARGEABLE LITHIUM BATTERY, A METHOD OF PREPARING THE SAME, AND A RECHARGEABLE LITHIUM BATTERY INCLUDING THE SAME

(75) Inventors: Kyoung-Han Yew, Suwon-si (KR); Nam-Soon Choi, Suwon-si (KR); Sung-Soo Kim, Suwon-si (KR); Su-Yeong Park, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 899 days.

(21) Appl. No.: 11/984,807

(22) Filed: Nov. 21, 2007

(65) Prior Publication Data
US 2008/0118834 A1  May 22, 2008

(30) Foreign Application Priority Data
Nov. 22, 2006  (KR) .......................... 10-2006-0115866

(51) Int. Cl.
```
H01M 4/60       (2006.01)
H01M 4/58       (2010.01)
H01M 10/52      (2006.01)
C01G 37/00      (2006.01)
C01G 39/00      (2006.01)
H01M 4/131      (2010.01)
H01M 4/36       (2006.01)
H01M 10/0525    (2010.01)
C01G 31/00      (2006.01)
C01G 41/00      (2006.01)
H01M 4/62       (2006.01)
H01M 4/134      (2010.01)
H01M 4/04       (2006.01)
H01M 4/02       (2006.01)
```
(52) U.S. Cl.
CPC ............. *H01M 4/62* (2013.01); *C01P 2002/82* (2013.01); *C01G 37/006* (2013.01); *C01G 39/006* (2013.01); *H01M 4/131* (2013.01); *H01M 4/366* (2013.01); *Y02E 60/122* (2013.01); *C01P 2006/40* (2013.01); *H01M 10/0525* (2013.01); *H01M 4/04* (2013.01); *C01G 31/006* (2013.01); *C01G 41/006* (2013.01); *H01M 2004/021* (2013.01); *H01M 4/134* (2013.01)
USPC ................... 429/212; 429/231.95; 429/231.9; 429/231.5

(58) Field of Classification Search
None
See application file for complete search history.

(56) References Cited

U.S. PATENT DOCUMENTS 5,284,721 A  2/1994  Beard
5,378,560 A  1/1995  Tomiyama
(Continued)

FOREIGN PATENT DOCUMENTS

CN  1298556  6/2001
CN  1304187  7/2001
(Continued)

OTHER PUBLICATIONS

Occlude, absorption. Dictionary.com. Dictionary.com Unabridged. Random House, Inc. http://dictionary.reference.com/browse/absorption (accessed: Jul. 15, 2010).*

(Continued)

*Primary Examiner* — Edu E Enin-Okut
(74) *Attorney, Agent, or Firm* — Robert E. Bushnell, Esq.

(57) ABSTRACT

A negative active material for a rechargeable lithium battery includes a core including an active material being capable of performing reversible electrochemical oxidation and reduction, and a coating layer on the surface of the core. The coating layer includes a reticular structure including —O-M-O— wherein M is selected Si, Ti, Zr, Al, or combinations thereof and an organic functional group linked to the M as a side chain. The organic functional group is selected from the group consisting of an alkyl group, a haloalkyl group, a substituted or unsubstituted aryl group, and combinations thereof. The negative active material for a rechargeable lithium battery according to the present invention can be applied along with an aqueous binder, and improve high capacity, good cycle-life, and particularly high capacity during charge and discharge at a high rate.

12 Claims, 5 Drawing Sheets

(56) References Cited

U.S. PATENT DOCUMENTS

| | | |
|---|---|---|
| 5,478,671 A | 12/1995 | Idota |
| 5,506,075 A | 4/1996 | Iwasaki et al. |
| 5,700,598 A | 12/1997 | Denis et al. |
| 5,705,291 A | 1/1998 | Amatucci et al. |
| 5,795,679 A | 8/1998 | Kawakami et al. |
| 5,879,691 A | 3/1999 | Sagel et al. |
| 6,071,489 A | 6/2000 | Sun et al. |
| 6,210,834 B1 | 4/2001 | Kweon et al. |
| 6,218,050 B1 | 4/2001 | Yoon et al. |
| 6,221,531 B1 | 4/2001 | Vaughey et al. |
| 6,316,143 B1 | 11/2001 | Foster et al. |
| 6,482,537 B1 | 11/2002 | Strangman et al. |
| 6,596,437 B2 | 7/2003 | Yoon et al. |
| 6,783,890 B2 | 8/2004 | Kweon et al. |
| 6,986,968 B2 | 1/2006 | Hong et al. |
| 7,285,358 B2 | 10/2007 | Park et al. |
| 7,682,746 B2 | 3/2010 | Koshina |
| 2001/0019774 A1 | 9/2001 | Suzuki et al. |
| 2001/0046628 A1 | 11/2001 | Oesten et al. |
| 2001/0055711 A1 | 12/2001 | Ito et al. |
| 2003/0003362 A1 | 1/2003 | Leising et al. |
| 2003/0031919 A1 | 2/2003 | Isozaki et al. |
| 2003/0049541 A1 | 3/2003 | Inagaki et al. |
| 2003/0124431 A1 | 7/2003 | Hwang et al. |
| 2003/0130114 A1 | 7/2003 | Hampden-Smith et al. |
| 2003/0207178 A1 | 11/2003 | Hu et al. |
| 2003/0211396 A1 | 11/2003 | Kobayashi et al. |
| 2003/0215700 A1 | 11/2003 | Hosoda et al. |
| 2004/0005265 A1 | 1/2004 | Chiang et al. |
| 2004/0018431 A1 | 1/2004 | Gozdz et al. |
| 2004/0029010 A1 | 2/2004 | Sada et al. |
| 2004/0072073 A1 | 4/2004 | Okochi et al. |
| 2004/0106040 A1 | 6/2004 | Fukuoka et al. |
| 2004/0157133 A1 | 8/2004 | Kim et al. |
| 2005/0042515 A1 | 2/2005 | Hwang et al. |
| 2005/0079417 A1* | 4/2005 | Kim et al. .................. 429/231.2 |
| 2005/0164090 A1 | 7/2005 | Kim et al. |
| 2005/0191550 A1 | 9/2005 | Satoh et al. |
| 2006/0088766 A1 | 4/2006 | Kim et al. |
| 2006/0166098 A1 | 7/2006 | Tabuchi et al. |
| 2006/0204850 A1 | 9/2006 | Ham et al. |
| 2006/0236528 A1 | 10/2006 | Xu et al. |
| 2007/0099085 A1* | 5/2007 | Choi et al. ............... 429/231.95 |
| 2007/0166615 A1 | 7/2007 | Takamuku et al. |
| 2007/0207384 A1* | 9/2007 | Nakura ...................... 429/231.1 |
| 2008/0118834 A1 | 5/2008 | Yew et al. |
| 2008/0118840 A1 | 5/2008 | Yew et al. |
| 2008/0118841 A1 | 5/2008 | Kim et al. |
| 2008/0145758 A1 | 6/2008 | Kim et al. |
| 2008/0182171 A1 | 7/2008 | Maeda et al. |
| 2008/0182172 A1 | 7/2008 | Takamuku et al. |
| 2008/0241688 A1 | 10/2008 | Tokita et al. |
| 2008/0254365 A1 | 10/2008 | Kim et al. |
| 2008/0305397 A1 | 12/2008 | Kobayashi et al. |
| 2009/0023070 A1 | 1/2009 | Tokita et al. |
| 2009/0068566 A1 | 3/2009 | Park et al. |
| 2010/0143800 A1 | 6/2010 | Sawada et al. |

FOREIGN PATENT DOCUMENTS

| | | |
|---|---|---|
| CN | 1339834 A | 3/2002 |
| CN | 1416600 | 5/2003 |
| CN | 1417876 | 5/2003 |
| CN | 200410061373.6 | 12/2004 |
| CN | 1607687 A | 4/2005 |
| CN | 1624960 | 6/2005 |
| CN | 1783551 A | 6/2006 |
| CN | 1841816 A | 10/2006 |
| CN | 1992420 | 7/2007 |
| EP | 1511101 | 3/2005 |
| EP | 1511101 A2 | 3/2005 |
| EP | 1708296 | 10/2006 |
| EP | 1801908 A1 | 12/2006 |
| JP | 59-020971 | 2/1984 |
| JP | 06-60867 | 3/1994 |
| JP | 06-275265 | 9/1994 |
| JP | 06-302320 | 10/1994 |
| JP | 06-325791 | 11/1994 |
| JP | 07-029600 | 1/1995 |
| JP | 07-029608 | 1/1995 |
| JP | 07014580 | 1/1995 |
| JP | 07-122298 | 5/1995 |
| JP | 08-124568 | 5/1996 |
| JP | 08-241707 | 9/1996 |
| JP | 10-188977 | 7/1998 |
| JP | 10-247497 | 9/1998 |
| JP | 10-270018 | 10/1998 |
| JP | 10-340723 | 12/1998 |
| JP | 11-185753 | 7/1999 |
| JP | 11-329435 | 11/1999 |
| JP | 11-354104 | 12/1999 |
| JP | 2000-058059 | 2/2000 |
| JP | 2000/090916 | 3/2000 |
| JP | 2000-299132 | 10/2000 |
| JP | 2001006683 A * | 1/2001 |
| JP | 2001297796 A * | 10/2001 |
| JP | 2001-325950 | 11/2001 |
| JP | 2002-008652 | 1/2002 |
| JP | 2002-216753 | 8/2002 |
| JP | 2002-324551 A | 11/2002 |
| JP | 2002-326818 | 11/2002 |
| JP | 2002-343431 | 11/2002 |
| JP | 2002-362923 | 12/2002 |
| JP | 2003/068305 | 3/2003 |
| JP | 2003-123757 | 4/2003 |
| JP | 2003-142096 | 5/2003 |
| JP | 2003-208891 A | 7/2003 |
| JP | 2004-139947 | 5/2004 |
| JP | 2004-149391 | 5/2004 |
| JP | 2004/327190 | 11/2004 |
| JP | 2005/072008 | 3/2005 |
| JP | 2005/135872 | 5/2005 |
| JP | 2005-158604 | 6/2005 |
| JP | 2005-216855 | 8/2005 |
| JP | 2006-66085 | 3/2006 |
| JP | 2006-128115 | 5/2006 |
| JP | 2007-173096 | 7/2007 |
| KR | 10-0331370 | 8/1995 |
| KR | 10-2000-0060301 A | 10/2000 |
| KR | 2001-0090522 | 10/2001 |
| KR | 10-2003-0021112 | 3/2003 |
| KR | 10-2003-0032220 A | 4/2003 |
| KR | 10-2004-0082803 | 9/2004 |
| KR | 2005/0020185 A | 3/2005 |
| KR | 10-0497251 | 6/2005 |
| KR | 2005/0052268 A | 6/2005 |
| KR | 10-2005-0077079 | 8/2005 |
| KR | 2006/0028327 A | 3/2006 |
| KR | 10-0570649 | 4/2006 |
| KR | 0570648 | 4/2006 |
| KR | 10-2006-0041828 A | 5/2006 |
| KR | 10-2006-0050745 A | 5/2006 |
| KR | 2006/0095221 A | 8/2006 |
| KR | 2007/0016431 A | 2/2007 |
| KR | 10-0759410 B1 | 9/2007 |
| KR | 2007/0091938 A | 9/2007 |
| WO | WO 95/02001 | 1/1995 |
| WO | 97/28569 A1 | 8/1997 |
| WO | 02061864 A1 | 8/2002 |
| WO | 03038931 A1 | 5/2003 |
| WO | 03096449 A1 | 11/2003 |
| WO | 2006/115681 A2 | 11/2006 |

OTHER PUBLICATIONS

*Search Report* from the European Patent Office issued in Applicant's corresponding European Patent Application No. 07121149.4 dated Feb. 27, 2008.

Oskam, et al., "Sol-Gel Synthesis of Carbon/Silica Gel Electrodes for Lithium Intercalation", *Electrochemical and Solid-State Letters*, vol. 2, No. 12, Dec. 1999, p. 610-612.

(56) References Cited

OTHER PUBLICATIONS

Ng, et al., "Si-O Network Encapsulated Graphite-Silicon Mixtures as Negative Electrodes for Lithium-Ion Batteries", *Journal of Power Sources*, vol. 94, No. 1, Feb. 15, 2001, p. 63-67.
Aurbach, et al., "Behavior of Lithiated Graphite Electrodes Comprising Silica Based Binder", *Journal of Applied Electrochemistry*, vol. 28, No. 10, Oct. 1998, p. 1051-1059.
Chen, et al., "Improving the Performance of Soft Carbon for Lithium-Ion Batteries", *Electrochemical Acta*, vol. 51, No. 19, May 20, 2006, p. 3890-3894.
Chinese Office Action issued on Oct. 13, 2010 for the corresponding Chinese Patent Application No. 200710169303.6.
Japanese Office Action issued by Japanese Patent Office on Mar. 8, 2011, corresponding to Korean Patent Application No. 10-2006-0115866 and Request for Entry of the Accompanying Office Action attached herewith.
Chinese Office action issued by Chine Patent Office on Sep. 21, 2011, corresponding to Chinese Application No. 200710169303.6 and its English Translation attached herewith.
Chinese Office Action issued Apr. 25, 2012 in connection with Chinese Patent Application Serial No. 200710169303.6, which also claims Korean Patent Application Serial No. 10-2006-0115866 as its priority document.
Chinese Office Action issued on Sep. 21, 2010 in the Chinese Patent Application No. 200710169308.9 which corresponds to U.S. Appl. No. 11/984,806.
Chinese Office Action issued on Aug. 14, 2009 in the Chinese Patent Application No. 2007101693089 which corresponds to U.S. Appl. No. 11/984,806 and Request for Entry of the Accompanying Office Action herewith.
Korean Office Action issued on Aug. 29, 2009 in the Korean Patent Application No. 10-2007-0091028 which corresponds to U.S. Appl. No. 12/230,945 and Request for Entry of the Accompanying Office Action herewith.
European Search Report issued on Feb. 19, 2008 in the European Patent Application No. 07120913.4 which corresponds to U.S. Appl. No. 11/984,531.
Ohzuku, et al., "Zero-Strain Insertion Material of Li [Li1/3Ti5/3]o4 for Rechargeable Lithium Cells", Journal of the Electrochemical Society, Electrochemical Society. vol. 142, No. 5, May 1, 1995, p. 1431-1435.
Mi, et al., "Carbon-coated Li1.2Cr0.4O2 Cathode Material for Lithium-Ion Batteries", Electrochemical and Solid-State Letters, vol. 9, No. 7, May 4, 2006, p. A324-A327.
Hiroshi Yamamoto et al., "Anode Properties of Li1+xV1-xO2 for Lithium Secondary Batteries", Abstract of 3B05 of the 43rd Battery Symposium in Japan, pp. 332-333.
Chinese Office Action issued on Oct. 18, 2010 in the Chinese Patent Application No. 200710169731.9 which corresponds to U.S. Appl. No. 11/042,330.
Chinese Office Action issued on May 25, 2010 in the Chinese Patent Application No. 200710169731.9 which corresponds to U.S. Appl. No. 11/042,330 and Request for Entry of the Accompanying Office Action herewith.
Chinese Office Action issued on Aug. 21, 2009 in the Chinese Patent Application No. 2007101697319 which corresponds to U.S. Appl. No. 11/042,330.
Korean Office Action issued on May 31, 2010 in the Korean Patent Application No. 10-2008-0063918 which corresponds to U.S. Appl. No. 12/216,467 and Request for Entry of the Accompanying Office Action herewith.
European Search Report issued on Jun. 12, 2008 in the European Patent Application No. 07121189.0 which corresponds to U.S. Appl. No. 11/984,806.
Office Action issued on Mar. 24, 2008 in the U.S. Appl. No. 11/834,335.
Japanese Office Action issued on Sep. 7, 2010 for Japanese Patent Application No. 2007-153122 and Request for Entry of the Accompanying Office Action herewith.
Japanese Office Action issued on Aug. 31, 2010 for Japanese Patent Application No. 2007-175311 and Request for Entry of the Accompanying Office Action herewith.
Chinese Office Action issued on Aug. 28, 2009 in the Chinese Patent Application No. 200710152425.4 and Request for Entry of the Accompanying Office Action herewith.
Office Action issued on May 13, 2009 in the U.S. Appl. No. 11/947,708.
Office Action issued on Jul. 2, 2009 in the U.S. Appl. No. 11/937,462.
European Search Report issued on Nov. 13, 2006 in the European Patent Application No. 04090319.7.
European Search Report issued on Feb. 18, 2008 in the European Patent Application No. 07120913.4.
European Search Report issued on Jun. 2, 2008 in the European Patent Application No. 08100042.4.
European Search Report issued on Jun. 2, 2008 in the European Patent Application No. 07116182.2.
Kim, S., Synthesis and characterization of MN V2 O6 as a high capacity anode material for a lithium secondary battery, solid State Ionics vol. 139 (2001), pp. 57-65.
Andrukaitis, Study of Mex(VO3)2 vanadates, (Me=Co, Ni, Mn, 1<x<2) for lithium rechargeable cells, Journal of Powers sources 81-82 (1999) pp. 651-655.
Van Landschoot, N., Citric acid-assisted synthesis and characterization of doped LiCoVo4, solid state Ionics, vol. 166, (2004), Science direct, pp. 307-316.
Sivashanmugam, A., Glycine-Assisted Sol-Gel combustion Synthesis and characterization of Aluminum-Doped LiNiVO4 for Use in Lithium-Ion Batteries, Journal of electrochemical Society, vol. 153, No. 3, (2006), pp. A497-A503, XP-002475390.
Huang, F., et al., A novel Li2Ag0.5V2O5 Composite film Cathode for all-solid-State Lithium Batteries, Electrochemistry Communications, vol. 5, (2003), pp. 262-266.
Office Action issued on Sep. 8, 2010 in the U.S. Appl. No. 11/590,980.
Office Action issued on Apr. 8, 2010 in the U.S. Appl. No. 11/984,806.
Office Action issued on Feb. 3, 2010 in the U.S. Appl. No. 11/984,806.
Office Action issued on Jul. 23, 2009 in the U.S. Appl. No. 11/984,806.
Office Action issued on Jun. 25, 2010 in the U.S. Appl. No. 11/984,531.
Office Action issued on Jan. 11, 2010 in the U.S. Appl. No. 11/984,531.
Office Action issued on May 12, 2010 in the U.S. Appl. No. 11/042,330.
Office Action issued on Dec. 12, 2008 in the U.S. Appl. No. 11/042,330.
Office Action issued on Mar. 9, 2010 in the U.S. Appl. No. 11/042,330.
Office Action issued on Nov. 16, 2009 in the U.S. Appl. No. 12/135,078.
Office Action issued on May 26, 2010 in the U.S. Appl. No. 12/135,078.
Liu, et al., "A Soft Chemistry Synthesis and Electrochemical Properties of LiV3O8 Secondary Batteries" Solid State Ionics. vol. 176. p. 1549-1554. 2005 (XP-2002475780).
European Search Report issued on Jun. 2, 2008 in the European Patent Application No. 07123519.6 which corresponds to U.S. Appl. No. 12/000,906.
Chinese Office Action issued on Nov. 12, 2010 in the Chinese Patent Application No. 200710192826.2 which corresponds to U.S. Appl. No. 11/984,531.
Office Action dated Jan. 6, 2010 in the U.S. Appl. No. 11/641,947.
Office Action dated Jul. 23, 2009 in the U.S. Appl. No. 11/641,947.

\* cited by examiner

NEGATIVE ACTIVE MATERIAL FOR A RECHARGEABLE LITHIUM BATTERY, A METHOD OF PREPARING THE SAME, AND A RECHARGEABLE LITHIUM BATTERY INCLUDING THE SAME

CROSS-REFERENCE TO RELATED APPLICATION AND CLAIM OF PRIORITY

This application claims priority to and the benefit of Korean Patent Application No. 10-2006-0115866 filed in the Korean Intellectual Property Office on Nov. 22, 2006, the entire content of which is incorporated herein by reference.

BACKGROUND OF THE INVENTION (a) Field of the Invention

The present invention relates to a negative active material for a rechargeable lithium battery, a method of preparing the same, and a rechargeable lithium battery including the same.

(b) Description of the Related Art

A lithium rechargeable battery has recently drawn attention as a power source of a small portable electronic device. It uses an organic electrolyte solution and thereby has a discharge voltage that is twice as high as a conventional battery using an alkali aqueous solution, and accordingly has a high energy density.

A negative active material for a lithium battery can reversibly receive and supply lithium ions while maintaining its structural and electrical properties. For the negative active material, a lithium metal, a lithium-containing alloy, or a carbon-based material with a potential that is similar to lithium metal when lithium ions are intercalated/deintercalated is usually used. A battery using lithium metal or a lithium alloy as a negative active material is called a lithium metal battery, and a battery using a carbon material is called a lithium ion battery.

A lithium metal battery using lithium metal or a lithium alloy as its negative electrode has a risk of explosion due to a dendrite-short-circuit. Hence, the lithium metal battery is being replaced by a lithium ion battery that uses a carbon material as its negative active material and does not have such a risk. The lithium ion battery transfers only lithium ions during charge/discharge, and it maintains the electrode active material as it is. Thus, the lithium ion battery has improved stability and cycle-life.

In the lithium ion battery, a non-aqueous system in which polyvinylidene fluoride (polyvinylidene difluoride or PVDF) is dissolved in N-methyl-2-pyrrolidone (NMP) or an organic acetone solvent is usually used as a binder for a conventional negative electrode plate. However, when the PVDF/NMP non-aqueous system is used as a binder, the organic solvent such as NMP and acetone may contaminate the natural environment. Also, since the organic solvent is expensive, the manufacturing cost for a lithium battery is increased. In addition, since most organic solvents are highly volatile, there is a risk of explosion when they are used in an enclosed space. To prevent explosions, an anti-explosion unit is additionally required.

To overcome the problems, researchers are actively studying to develop a method of using an aqueous system in which styrene-butadiene rubber (SBR) is dispersed in water along with a thickener, e.g., carboxymethyl cellulose (CMC), when a negative electrode plate is manufactured. Since the SBR binder can be dispersed in water in the form of emulsion, it does not have to use an organic solvent, and the SBR binder has strong adherence. With the SBR binder, the amount of a binder is reduced and the amount of a negative active material is increased, which is advantageous in manufacturing a high-capacity lithium battery.

When an aqueous solvent is used with an aqueous binder, the high surface tension of the aqueous solvent deteriorates the coating property of a negative active material slurry to thereby reduce the planarity of a negative electrode. The low planarity of the negative electrode makes the surface of the negative electrode non-uniform to thereby reduce a reaction surface area and deteriorate the cycle-life characteristic.

The above information disclosed in this Background section is only for enhancement of understanding of the background of the invention and therefore it may contain information that does not form the prior art that is already known in this country to a person of ordinary skill in the art.

SUMMARY OF THE INVENTION

One embodiment of the present invention provides a negative active material for a rechargeable lithium battery that can improve stability at the interface between a negative electrode and an electrolyte, be applied with an aqueous binder as well as a non-aqueous binder, and improve high capacity, good cycle-life, and particularly high capacity during charge and discharge at a high rate, and a method of preparing the negative active material.

Another embodiment of the present invention provides a rechargeable lithium battery including the negative active material and having high capacity and excellent cycle-life and particularly high capacity during charge and discharge at a high rate.

According to one embodiment of the present invention, provided is a negative active material for a rechargeable lithium battery that includes a core including an active material being capable of performing reversible electrochemical oxidation and reduction, and a coating layer on the surface of the core. The coating layer includes a reticular structure including —O-M-O— wherein M is selected from Si, Ti, Zr, Al, or combinations thereof, and an organic functional group linked to the M as a side chain.

The organic functional group is selected from the group consisting of an alkyl group, a haloalkyl group, a substituted or unsubstituted aryl group, and combinations thereof.

The substituted aryl group may be an aryl group substituted by at least one functional group selected from the group consisting of an alkyl group, a haloalkyl group, and combinations thereof.

The organic functional group may be selected from the group consisting of a C1 to C10 alkyl group, a C1 to C10 haloalkyl group, a C6 to C12 aryl group, a C6 to C12 aryl group substituted by at least one C1 to C10 alkyl group, a C6 to C12 aryl group substituted by at least one C1 to C10 haloalkyl group, and combinations thereof. The aryl group may be benzyl, phenyl, or tolyl.

The coating layer has a thickness of 20 nm or less. According to one embodiment, the coating layer has a thickness of 10 nm or less. According to another embodiment, the coating layer has a thickness ranging from 5 to 10 nm.

The active material is a material selected from the group consisting of a material being capable of reversibly intercalating and deintercalating lithium ions, a lithium metal, a lithium-containing alloy, and a material being capable of reversibly forming a lithium-containing compound by reacting with lithium ions.

The active material is selected from the group consisting of crystalline carbon; amorphous carbon; Si, silicon oxide, Sn; tin oxide, a tin alloy composite, a transition element oxide, a lithium metal nitride, lithium vanadium oxide, and a lithium-containing alloy including at least one metal selected from the group consisting of Na, K, Rb, Cs, Fr, Be, Mg, Ca, Sr, Ba, Ra, Al, Fe, Sn, and combinations thereof.

The active material is a compound represented by the following Formula 1:

$$Li_xM'_yV_zO_{2+d}$$ [Chemical Formula 1]

wherein, in the above formula, $0.1 \leq x \leq 2.5$, $0 \leq y \leq 0.5$, $0.5 \leq z \leq 1.5$, $0 \leq d \leq 0.5$, and M' is a metal selected from the group consisting of Al, Cr, Mo, Ti, W, Zr, and combinations thereof.

According to another embodiment of the present invention, provided is a method of making a negative active material for a rechargeable lithium battery that includes preparing a core liquid by mixing a core material (i.e., an active material) being capable of performing reversible electrochemical oxidation and reduction, an organic solvent, a base, and water; preparing a precursor liquid including an organic-inorganic hybrid precursor including the organic functional group, an organic solvent, and water; and mixing the core liquid and the precursor liquid.

The organic-inorganic hybrid precursor is used in an amount of 1 to 30 parts by weight based on 100 parts by weight of the core material. According to one embodiment, the organic-inorganic hybrid precursor is used in an amount of 1 to 20 parts by weight based on 100 parts by weight of the core material. According to another embodiment, the organic-inorganic hybrid precursor is used in an amount of 1 to 10 parts by weight based on 100 parts by weight of the core material.

The base is ammonia water. The core material is used in an amount of 1 to 10 g per 1,000 ml of organic solvent(s) in the mixture of the core liquid and the precursor liquid, the base is used at a concentration of 0.05 to 1M, and the water is used at a concentration of 10 to 20M in the mixture of the core liquid and the precursor liquid.

According to yet another embodiment of the present invention, provided is a rechargeable lithium battery that includes a negative electrode including the negative active material, a positive electrode including a positive active material, and an electrolyte.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1A:
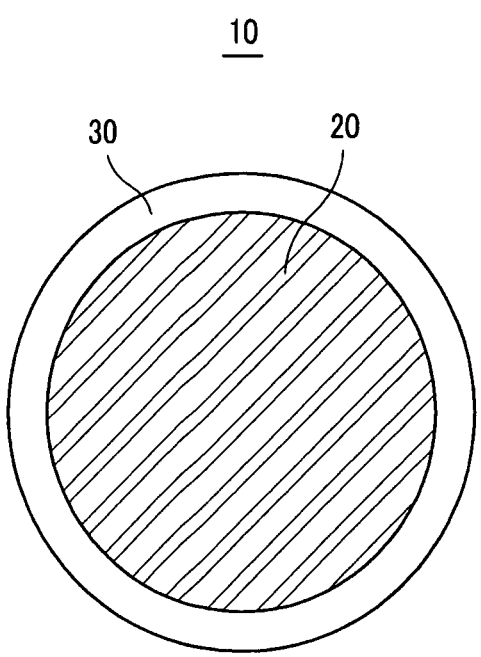
FIGS. 1A and 1B schematically show a negative active material for a rechargeable lithium battery according to one embodiment of the present invention.

The present invention relates to a negative active material for a rechargeable lithium battery that has a core-shell structure.

The core includes an active material being capable of performing reversible electrochemical oxidation and reduction. The active material may be a material selected from the group consisting of a material being capable of reversibly intercalating and deintercalating lithium ions, a lithium metal, a lithium-containing alloy, a material being capable of reversibly forming a lithium-containing compound by reacting with lithium ions.

The material being capable of reversibly intercalating and deintercalating lithium ions may be a generally-used carbon-based negative active material such as crystalline carbon, amorphous carbon, and combinations thereof.

The material being capable of reversibly forming a lithium-containing compound by reacting with lithium ions may include Si, silicon oxide, Sn, tin oxide, a tin alloy composite, a transition element oxide, a lithium metal nitride, or a lithium metal oxide such as lithium vanadium oxide.

The lithium-containing alloy may be an alloy of lithium and a metal selected from the group consisting of Na, K, Rb, Cs, Fr, Be, Mg, Ca, Sr, Ba, Ra, Al, Fe, and Sn.

According to one embodiment of the present invention, the active material is a compound represented by the following Formula 1:

$$Li_xM'_yV_zO_{2+d}$$ [Chemical Formula 1]

wherein, in the above formula, $0.1 \leq x \leq 2.5$, $0 \leq y \leq 0.5$, $0.5 \leq z \leq 1.5$, $0 \leq d \leq 0.5$, and M' is a metal selected from the group consisting of Al, Cr, Mo, Ti, W, Zr, and combinations thereof.

The coating layer is disposed on the core, has a reticular structure, and includes a material including an element selected from the group consisting of Si, Ti, Zr, Al, and combinations thereof. In particular, the core is surrounded by a coating layer including —O-M-O— (wherein M is Si, Ti, Zr, or Al), and an organic functional group linked to the M as a side chain. The organic functional group is linked to M and does not link to the core.

The organic functional group is selected from the group consisting of an alkyl group, a haloalkyl group, a substituted or unsubstituted aryl group, and combinations thereof. The substituted aryl group may be an aryl substituted by a functional group selected from the group consisting of an alkyl group, a haloalkyl group, and combinations thereof. The aryl group may be benzyl, phenyl, or tolyl.

According to one embodiment of present invention, the organic functional group is selected from the group consisting of a C1 to C10 alkyl group, a C1 to C10 haloalkyl group, a C6 to C12 aryl group, a C6 to C12 aryl group substituted by at least one C1 to C10 alkyl group, a C6 to C12 aryl group substituted by at least one C1 to C10 haloalkyl group, a C6 to C12 aryl group substituted by at least one C1 to C10 haloalkyl group, and combinations thereof.

The coating layer has a nano-sized thickness that can conduct lithium ions, and does not incur resistance. According to one embodiment, the inorganic oxide coating layer has a thickness of 20 nm or less. According to another embodiment, the coating layer has a thickness of 10 nm or less. According to yet another embodiment, the coating layer has a thickness of 5 to 10 nm. When the coating layer has a thickness of more than 20 nm, it may act as a resistance layer to reduce transfer speed of electrons and lithium ions into the core active material, resulting in a significant decrease of electrochemical characteristic such as high rate characteristics, cycle-life, and so on.

FIG. 1A schematically shows a negative active material for a rechargeable lithium battery according to one embodiment of the present invention.

Figure 1B:
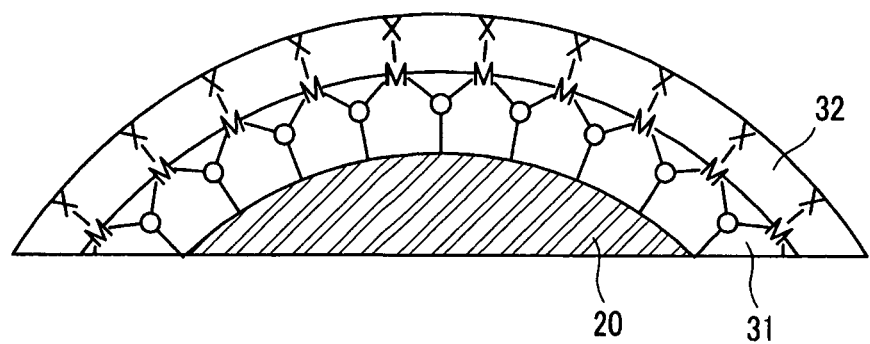

As shown in FIG. 1A, the active material 10 has a core-shell structure including the core 20 and the coating layer 30. FIG. 1B is an enlarged view of the coating layer 30 of an exemplary negative active material. —O-M-O— linkages surround the surface of the core, and the organic functional group, X, is linked to M as a side chain. As shown in FIG. 1B, the active material 10 includes —O-M-O— linkages having a reticular structure 31 disposed on the surface of the core 20, and the organic functional group 32 linked hereto.

An SEI (solid electrolyte interface) film is formed by electrochemical decomposition of an electrolyte at the interface between an electrolyte and a negative active material in a conventional battery system. According to one embodiment of the present invention, the —O-M-O— linkages are disposed on the surface of the core to minimize formation of an SEI film during charge and discharge and thereby improve reversible efficiency and cycle-life.

The negative active material according to one embodiment of the present invention is prepared as follows.

The core material, an organic solvent, a base, and water are mixed to prepare a core liquid. An organic-inorganic hybrid precursor, an organic solvent, and water are mixed to prepare a precursor liquid. Then the core liquid and the precursor liquid are mixed.

The core liquid and the precursor liquid can be used in an appropriate amount so that the core material might be in an amount of 1 to 10 g per 1,000 ml of an organic solvent(s) in the mixture of the core liquid and the precursor liquid, 0.05 to 1M base, and 10 to 20M water in the mixture of the core liquid and the precursor liquid.

The core liquid and the precursor liquid can be mixed in an appropriate mixing ratio so that the component materials may be within the above range. The organic-inorganic hybrid precursor can be included in an amount of 1 to 30 parts by weight based on 100 parts by weight of the core material. According to one embodiment, the organic-inorganic hybrid precursor can be included in an amount of 1 to 20 parts by weight based on 100 parts by weight of the core material. According to another embodiment, the organic-inorganic hybrid precursor can be included in an amount of 1 to 10 parts by weight based on 100 parts by weight of the core material. When an organic-inorganic hybrid precursor is included in an amount of less than 1 part by weight, the prepared coating layer may have little effect. On the contrary, when it is included in an amount of more than 30 parts by weight, a thick net-structured membrane is formed, increasing resistance of an electrode.

The core liquid is prepared by dispersing a core material into an organic solvent, and then adding a base and water to the mixture.

The core material includes the aforementioned active material.

The base plays a role of a catalyst promoting a reaction. It can include any base, so far as the base acts as a catalyst promoting a reaction. For example, it may include ammonia water with pH 8 to 9.

The organic solvent may be selected from the group consisting of methanol, ethanol, propanol, isopropanol, and mixtures thereof.

The precursor liquid is prepared by mixing an organic-inorganic hybrid precursor, an organic solvent, and water. Herein, the organic solvent may be selected from the group consisting of methanol, ethanol, propanol, isopropanol, and mixtures thereof.

The organic-inorganic hybrid precursor may include at least two functional groups participating in a sol-gel reaction, and also one or two functional groups not participating in a sol-gel reaction, which are bound at M therein. According to one embodiment, it may include only one functional group not participating in sol-gel reaction.

The organic-inorganic hybrid precursor may include a compound represented by the following Formula 2:

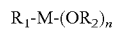   [Chemical Formula 2]

wherein, in the above formula, M is selected from the group consisting of Si, Ti, Zr, and Al, $R_1$ is selected from the group consisting of an alkyl group, a haloalkyl group, a substituted or unsubstituted aryl group, and combinations thereof, $R_2$ is a C1 to C7 alkyl group, and n is determined according to a valence of the M. According to one embodiment, n ranges from 1 to 6 and in another embodiment, n ranges from 1 to 4.

According to one embodiment of the present invention, $R_1$ is selected from the group consisting of a C1 to C10 alkyl group, a C1 to C10 haloalkyl group, a C6 to C12 aryl group, a C6 to C12 aryl group substituted by at least one C1 to C10 alkyl group, a C6 to C12 aryl group substituted by at least one C1 to C10 haloalkyl group, and combinations thereof, and $R_2$ is a C1 to C5 alkyl group.

The organic-inorganic hybrid precursor represented by the above Formula 2 may include a compound represented by the following Formula 2a.

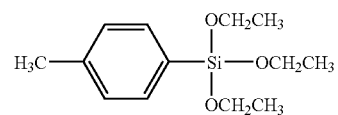   [Chemical Formula 2a]

In the above mixing process, when a precursor surrounds a core material, they simultaneously have hydrolysis and condensation reactions, through which a coating layer with a reticular structure is formed from the precursor on the surface of the core material.

Next, a solvent in the reaction is volatilized and then heat-treated, obtaining a negative active material according to the present invention.

Herein, the volatilization process is performed by heat-treating a dispersion at a temperature of 50 to 100° C. According to another embodiment of the present invention, it may be performed at a temperature of 60° C. The temperature for volatilization can be appropriately changed depending on kinds of alcohol used as a solvent of a dispersion. When the volatilization is performed at a temperature of lower than 50° C., the volatilization process may become too long, while when at a temperature of higher than 100° C., there may be no big different effects, compared with 100° C.

In addition, the heat treatment can be performed at a temperature of 300 to 600° C. When the heat treatment is performed at a temperature of lower than 300° C., impurities may remain inside a core material. On the contrary, when performed at a temperature of higher than 600° C., it may not be economical.

The coating layer formed in this way may have a thickness of nanometers. According to one embodiment, it may have a thickness of less than 20 nm, and according to another embodiment, it may have a thickness ranging from 5 to 10 nm. When a coating layer includes an organic functional group, it may have increased miscibility with a binder, which will be used for preparing a composition for an electrode.

The rechargeable lithium battery includes a negative electrode including the above negative active material, a positive electrode, and an electrolyte.

The negative electrode includes a current collector and a negative active material layer disposed on the current collector. The negative active material layer includes the above negative active material.

The negative electrode may be fabricated as follows: a composition including the negative active material, a binder, and optionally a conductive agent which are mixed in a solvent is applied on a negative current collector such as copper.

The negative active material is the same as the above-described. According to one embodiment, the negative active material is included in an amount of 50 to 99 wt % based on the total weight of the negative active material-layer. According to another embodiment, the negative active material is included in an amount of 80 to 98 wt % based on the total weight of the negative active material layer. When the amount of the negative active material is less than 50 wt %, battery capacity may be decreased, whereas when it is more than 99 wt %, the relative amount of binder is reduced and thus binding force between the negative active material layer and a current collector may be decreased.

The amount of the binder ranges from 0.8 to 5 wt % based on a total weight of the negative active material layer. According to one embodiment, the amount of the binder ranges from 1 to 5 wt %. According to another embodiment, the amount of the binder ranges from 1 to 2 wt %. When the amount of the binder is less than 0.8 wt %, binder content is significantly low and adherence between a negative active material and a current collector is not sufficient. On the contrary, when it is more than 5 wt %, the amount of the negative active material is low and thus a high-capacity battery cannot be realized.

Herein, aqueous or non-aqueous binders may be used for the binder.

For the aqueous binder, at least one selected from the group consisting of styrene-butadiene rubber (SBR), polyvinyl alcohol, carboxymethyl cellulose, hydroxypropyl cellulose, diacetyl cellulose, and mixtures thereof may be used. Since the aqueous binder can be dispersed in water in the form of an emulsion, it does not have to use an organic solvent. Also, since it is highly adhesive, the amount of the binder to be used can be reduced and the amount of the negative active material can be increased. Therefore, it is advantageous in the manufacture of a high-capacity lithium battery. The aqueous binder is used together with water or an aqueous solvent of water and an alcohol solvent.

When an aqueous binder is used, a thickener may be added thereto to adjust the viscosity. The thickener may be at least one selected from the group consisting of carboxyl methyl cellulose, hydroxymethyl cellulose, hydroxy ethyl cellulose, hydroxy propyl cellulose, and combinations thereof. The amount of the thickener may range from 0.8 to 5 wt % based on the entire negative active material layer. According to one embodiment, the amount of the thickener may range from 1 to 5 wt % based on the entire negative active material layer. According to another embodiment, the amount of the thickener may range from 1 to 2 wt % based on the entire negative active material layer.

When the amount of the thickener is less than 0.8 wt %, there may be a problem that the negative active material may run during coating. When the amount of the thickener is more than 5 wt %, the viscosity of the negative active material becomes too high for coating and rather it functions as a resistance. Also, when the amount of the thickener is more than 5 wt %, the amount of the negative active material is reduced so that the produced battery may not have particularly high capacity.

Examples of the non-aqueous binder include at least one selected from the group consisting of polyvinylchloride, polyvinylpyrrolidone, polytetrafluoroethylene, polyvinylidene fluoride, polyethylene, polypropylene, and mixtures thereof. These binders are used along with non-aqueous solvents such as N-methyl-2-pyrrolidone (NMP), dimethylformamide, tetrahydrofuran, and mixtures thereof.

Any electrically conductive material may be used as a conductive agent unless it causes a chemical change. Examples of the conductive agent include natural graphite, artificial graphite, carbon black, acetylene black, ketjen black, carbon fiber, a metal powder or a metal fiber including copper, nickel, aluminum, silver, and so on, a polyphenylene derivative, or combinations thereof.

The current collector may be selected from the group consisting of a copper foil, a nickel foil, a stainless steel foil, a titanium foil, a nickel foam, a copper foam, a polymer substrate coated with a conductive metal, and combinations thereof.

The positive electrode includes a positive active material that is capable of performing a reversible electrochemical oxidation and reduction and is a generally-used lithiated intercalation compound in a rechargeable lithium battery. The lithiated intercalation compound includes compounds of the following Formulas 3 to 26.

$$Li_aA'_{1-b}B'_bD'_2 \quad\quad\quad \text{[Chemical Formula 3]}$$

wherein, in the above formula, $0.95 \leq a \leq 1.1$ and $0 \leq b \leq 0.5$.

$$Li_aE'_{1-b}B'_bO_{2-c}F'_c \quad\quad\quad \text{[Chemical Formula 4]}$$

wherein, in the above formula, $0.95 \leq a \leq 1.1$, $0 \leq b \leq 0.5$, and $0 \leq c \leq 0.05$.

$$LiE'_{2-b}B'_bO_{4-c}F'_c \quad\quad\quad \text{[Chemical Formula 5]}$$

wherein, in the above formula, $0 \leq b \leq 0.5$ and $0 \leq c \leq 0.05$.

$$Li_aNi_{1-b-c}Co_bB'_cD'_\alpha \quad\quad\quad \text{[Chemical Formula 6]}$$

wherein, in the above formula, $0.95 \leq a \leq 1.1$, $0 \leq b \leq 0.5$, $0 \leq c \leq 0.05$, and $0 < \alpha < 2$.

$$Li_aNi_{1-b-c}Co_bB'_cO_{2-\alpha}F'_\alpha \quad\quad\quad \text{[Chemical Formula 7]}$$

wherein, in the above formula, $0.95 \leq a \leq 1.1$, $0 \leq b \leq 0.5$, $0 \leq c \leq 0.05$, and $0 < \alpha < 2$.

$$Li_aN_{1-b-c}Co_bB'_cO_{2-\alpha}F'_2 \quad\quad\quad \text{[Chemical Formula 8]}$$

wherein, in the above formula, $0.95 \leq a \leq 1.1$, $0 \leq b \leq 0.5$, $0 \leq c \leq 0.05$, and $0 < \alpha < 2$.

$$Li_aNi_{1-b-c}Mn_bB'_cD'_\alpha \quad\quad\quad \text{[Chemical Formula 9]}$$

wherein, in the above formula, $0.95 \leq a \leq 1.1$, $0 \leq b \leq 0.5$, $0 \leq c \leq 0.05$, and $0 < \alpha < 2$.

$$Li_aNi_{1-b-c}Mn_bB'_cO_{2-\alpha}F'_\alpha \quad\quad\quad \text{[Chemical Formula 10]}$$

wherein, in the above formula, $0.95 \leq a \leq 1.1$, $0 \leq b \leq 0.5$, $0 \leq c \leq 0.05$, and $0 < \alpha < 2$.

$$Li_aNi_{1-b-c}Mn_bB'_cO_{2-\alpha}F'_2 \quad\quad\quad \text{[Chemical Formula 11]}$$

wherein, in the above formula, $0.95 \leq a \leq 1.1$, $0 \leq b \leq 0.5$, $0 \leq c \leq 0.05$, and $0 < \alpha < 2$.

$$Li_aNi_bE'_cG'_dO_2 \quad\quad\quad \text{[Chemical Formula 12]}$$

wherein, in the above formula, $0.90 \leq a \leq 1.1$, $0 \leq b \leq 0.9$, $0 \leq c \leq 0.9$, and $0.01 \leq d \leq 0.2$.

$$Li_aNi_bCo_cMn_dG'_eO_2 \quad\quad\quad \text{[Chemical Formula 13]}$$

wherein, in the above formula, $0.90 \leq a \leq 1.1$, $0 \leq b \leq 0.9$, $0 \leq c \leq 0.5$, $0 \leq d \leq 0.5$, and $0.001 \leq e \leq 0.2$.

$$Li_aNiG'_bO_2 \quad\quad\quad \text{[Chemical Formula 14]}$$

wherein, in the above formula, $0.90 \leq a \leq 1.1$ and $0.001 \leq b \leq 0.1$.

$$Li_aCoG'_bO_2 \quad \text{[Chemical Formula 15]}$$

wherein, in the above formula, $0.90 \leq a \leq 1.1$ and $0.001 \leq b \leq 0.1$.

$$Li_aMnG'_bO_2 \quad \text{[Chemical Formula 16]}$$

wherein, in the above formula, $0.90 \leq a \leq 1.1$ and $0.001 \leq b \leq 0.1$.

$$Li_aMn_2G'_bO_4 \quad \text{[Chemical Formula 17]}$$

wherein, in the above formula, $0.90 \leq a \leq 1.1$ and $0.001 \leq b \leq 0.1$.

$$Q'O_2 \quad \text{[Chemical Formula 18]}$$

$$Q'S_2 \quad \text{[Chemical Formula 19]}$$

$$LiQ'S_2 \quad \text{[Chemical Formula 20]}$$

$$V_2O_5 \quad \text{[Chemical Formula 21]}$$

$$LiV_2O_5 \quad \text{[Chemical Formula 22]}$$

$$LiI'O_2 \quad \text{[Chemical Formula 23]}$$

$$LiNiVO_4 \quad \text{[Chemical Formula 24]}$$

$$Li_{3-f}J'_2(PO_4)_3 \ (0 \leq f \leq 3) \quad \text{[Chemical Formula 25]}$$

$$Li_{3-f}Fe_2(PO_4)_3 \ (0 \leq f \leq 2) \quad \text{[Chemical Formula 26]}$$

In the above Chemical Formulas 3 to 26, A' is selected from the group consisting of Ni, Co, Mn, and combinations thereof; B' is selected from the group consisting of Al, Ni, Co, Mn, Cr, Fe, Mg, Sr, V, a rare earth element, and combinations thereof; D' is selected from the group consisting of O, F, S, P, and combinations thereof; E' is selected from the group consisting of Co, Mn and combinations thereof; F' is selected from the group consisting of F, S, P, and combinations thereof; G' is selected from the group consisting of Al, Cr, Mn, Fe, Mg, La, Ce, Sr, V, a lanthanide element, and combinations thereof, Q' is selected from the group consisting of Ti, Mo, Mn, and combinations thereof; I' is selected from the group consisting of Cr, V, Fe, Sc, Y, and combinations thereof; and J' is selected from the group consisting of V, Cr, Mn, Co, Ni, Cu, and combinations thereof.

The electrolyte includes a non-aqueous organic solvent and a lithium salt.

The lithium salt is dissolved in the non-aqueous organic solvent to supply lithium ions in the battery. It may operate a basic operation of a rechargeable lithium battery, and it facilitates transmission of lithium ions between positive and negative electrodes. Non-limiting examples of the lithium salt include at least one supporting electrolyte salt selected from the group consisting of $LiPF_6$, $LiBF_4$, $LiSbF_6$, $LiAsF_6$, $LiCF_3SO_3$, $LiN(SO_2C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and lithium bisoxalate borate. The lithium salt may be used at a 0.1 to 2.0M concentration. When the lithium salt concentration is less than 0.1M, electrolyte performance may be deteriorated due to low electrolyte conductivity, whereas when it is more than 2.0M, lithium ion mobility may be reduced due to an increase of electrolyte viscosity.

The non-aqueous organic solvent acts as a medium for transmitting ions taking part in the electrochemical reaction of the battery. The non-aqueous organic solvent may include, but is not limited to, benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (wherein R is a C2 to C50 linear, branched, or cyclic hydrocarbon, a double bond, an aromatic ring, or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, ethylpropyl carbonate, methyl propionate, ethyl propionate, methyl acetate, ethyl acetate, propyl acetate, dimethoxyethane, 1,3-dioxolan, diglyme, tetraglyme, ethylene carbonate, propylene carbonate, γ-butyrolactone, sulfolane, valerolactone, decanolide, and mevalolactone. The non-aqueous organic solvent may be used singularly or in a mixture. When the organic solvent is used in a mixture, a mixing ratio can be controlled in accordance with a desirable cell performance.

Figure 2:
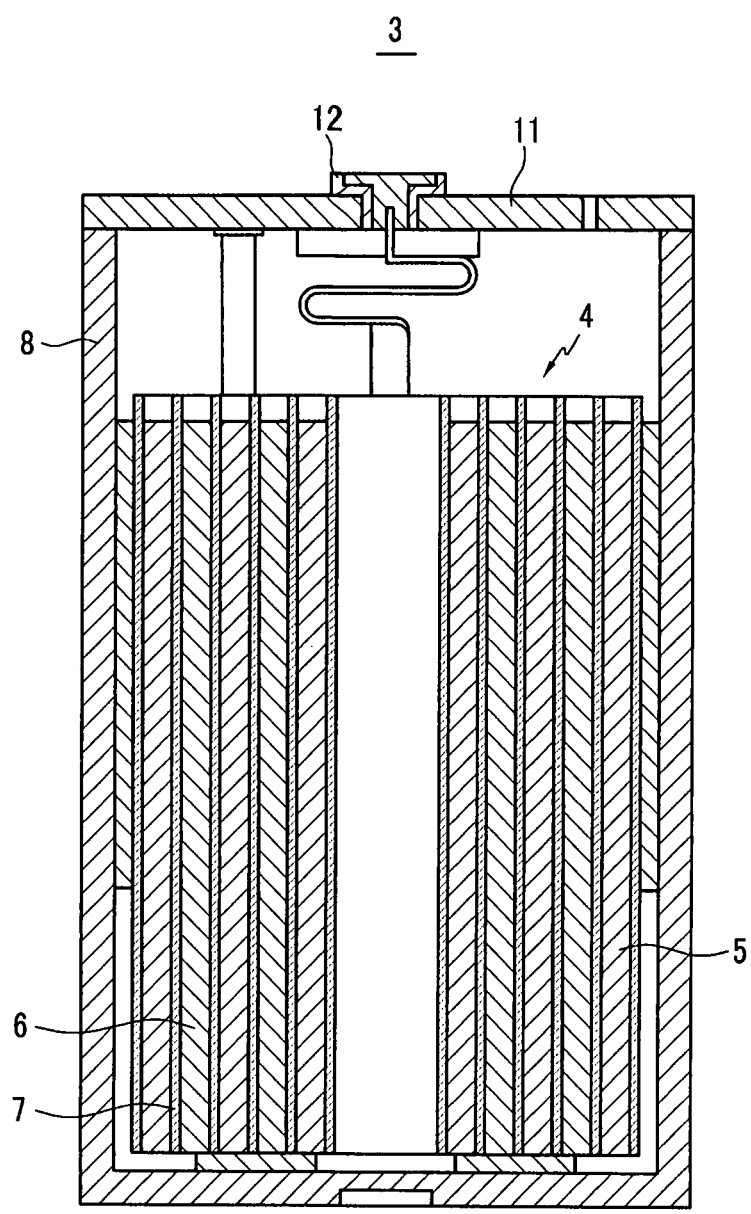
FIG. 2 schematically shows a rechargeable lithium battery according to one embodiment of the present invention.

FIG. 2 shows a rechargeable lithium battery having the above-mentioned structure according to an embodiment. Referring to FIG. 2, the rechargeable lithium battery 3 is composed of an electrode assembly 4 including a positive electrode 5, a negative electrode 6, a separator 7 interposed between the positive electrode 5 and the negative electrode 6 which is positioned in a battery case 8. The upper part of the cell case is sealed with a cap plate 11 and a gasket 12. The rechargeable lithium battery according to the present embodiment is not limited to the above-mentioned shape, and may be shaped into a prismatic shape, a pouch, and so on.

The rechargeable lithium battery generally includes a positive electrode, a negative electrode, and an electrolyte. The battery may further include a separator as needed. The separator may include any material used in conventional lithium secondary batteries. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene three-layered separator, and a polypropylene/polyethylene/polypropylene three-layered separator.

The following examples illustrate the present invention in more detail. However, it is understood that the present invention is not limited by these examples.

EXAMPLE 1

1 g of silicon (10 mm) as a core material and 100 mL of ethanol were added into a reactor and uniformly dispersed. Then, 0.2 M ammonia water prepared by mixing ammonia and water in a volume ratio of 29:71 was added to the dispersion. They were then uniformly mixed to prepare a core liquid.

On the other hand, a precursor liquid was prepared by adding 10 parts by weight of a compound represented by the following Formula 2a based on 100 parts by weight of the core material to 1 mL of ethanol and 1 mL of water.

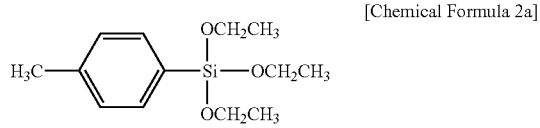

[Chemical Formula 2a]

The prepared precursor liquid was rapidly added to the core liquid to perform a hydrolysis and condensation reaction.

Next, the reaction solution was heated at 60° C. to volatilize ethanol, and then heat-treated at 450° C. to prepare a negative active material including a 8 nm-thick coating layer on the surface of silicon. The coating layer included as a core Si—O— was bounded with the core material, and a p-methyl phenyl group was positioned on a Si side chain that was not bonded with the core material.

EXAMPLE 2

A negative active material was prepared to have a 12 nm-thick coating layer on the surface of the silicon according to the same method as in Example 1, except that 30 parts by weight of an organic-inorganic hybrid precursor was used based on 100 parts by weight of a core material.

EXAMPLE 3

A negative active material was prepared to have a 19 nm-thick coating layer on the surface of the silicon according to the same method as in Example 1, except that 50 parts by weight of an organic-inorganic hybrid precursor was used based on 100 parts by weight of a core material.

EXAMPLE 4

A negative active material was prepared to have a 9 nm-thick coating layer according to the same method as in Example 1, except that $Li_{1.1}Ti_{0.1}V_{0.9}O_2$(10 mm) was used as a core material instead of silicon.

EXAMPLE 5

A negative active material was prepared to have an 11 nm-thick coating layer according to the same method as in Example 4, except that 30 parts by weight of an organic-inorganic hybrid precursor was used based on 100 parts by weight of a core material.

EXAMPLE 6

A negative active material was prepared to have a 20 nm-thick coating layer according to the same method as in Example 4, except that 50 parts by weight of an organic-inorganic hybrid precursor was used based on 100 parts by weight of a core material.

COMPARATIVE EXAMPLE 1

Silicon was used as a negative active material.

COMPARATIVE EXAMPLE 2

$Li_{1.1}Ti_{0.1}V_{0.9}O_2$ was used as a negative active material.

EXPERIMENTAL EXAMPLE 1

The negative active material prepared according to the Example 1 was examined regarding structure of the coating layer by measuring FT-IR (Fourier Transform Infrared Spectroscopy) spectra. The results are shown in FIG. 3.

Figure 3:
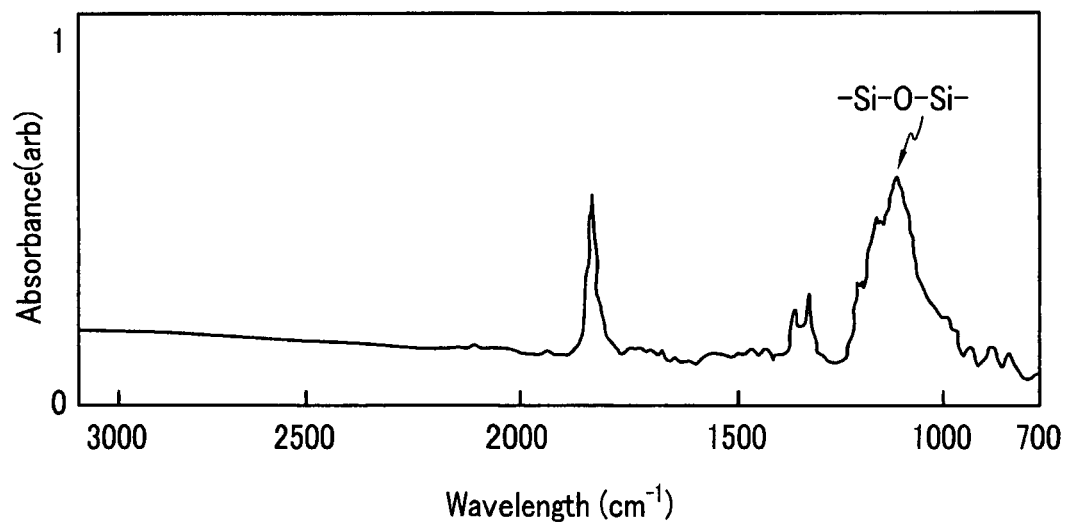
FIG. 3 shows a spectrum of the negative active material according to Example 1 measured by a Fourier Transform Infrared (FT-IR) spectrometer.

FIG. 3 showed FT-IR spectra of the negative active material prepared according to Example 1.

Referring to FIG. 3, it had a Si—O peak around $1110 cm^{-1}$. This means that the coating layer on the surface of negative active material prepared according to Example 1 had a —O—Si—O reticular structure formed from an organic-inorganic hybrid precursor.

Fabrication of a Battery Cell

A lithium cobalt oxide ($LiCoO_2$) positive active material and carbon black as a conductive agent were mixed to prepare a mixture. Next, a polyvinylidene fluoride binder was dissolved in an N-methyl-2-pyrrolidone solvent to prepare a binder solution. Then, the mixture was added to the binder solution to prepare a positive active material slurry.

The prepared positive active material slurry was coated to be 20 μm thick on an aluminum foil in a doctor blade method, dried at 120° C. for 10 hours under a vacuum atmosphere to volatilize N-methyl-2-pyrrolidone, and pressed to fabricate a positive electrode.

Likewise, the negative active materials prepared according to Examples 1 to 6 and carbon black conductive agents were added to an N-methylpyrrolidone solution, in which a polyvinylidene fluoride binder was dissolved, to prepare negative active material slurries.

The prepared negative active material slurries were respectively coated to be 12 μm thick on a copper foil in a doctor blade method, dried at 120° C. for 10 hours under a vacuum atmosphere to volatilize N-methyl-2-pyrrolidone, and pressed to fabricate negative electrodes.

Then, rechargeable lithium battery cells were fabricated using the fabricated positive and negative electrodes and a polyolefin (polyethylene and polypropylene) separator.

EXPERIMENTAL EXAMPLE 2

The rechargeable lithium battery cells including the negative active materials according to the Examples 1 to 6 and Comparative Examples 1 and 2 were charged up to 4.2 V and discharged down to 2.75 V at 0.2 C. Then, their coulomb efficiency was measured to estimate their initial reversible efficiency. The results are shown in the following Table 1.

TABLE 1

|  | Coulomb Efficiency |
| --- | --- |
| Example 1 | 80.5% |
| Example 2 | 81.8% |
| Example 3 | 77.0% |
| Example 4 | 91.8% |
| Example 5 | 90.0% |
| Example 6 | 87.5% |
| Comparative Example 1 | 72.0% |
| Comparative Example 2 | 86.0% |

As shown in the Table 1, the battery cells according to Examples 1 to 3 of the present invention had high coulomb efficiency compared with the battery cell according to Comparative Example 1. The same results were obtained when the battery cells according to Examples 4 to 6 were compared with that of Comparative Example 2.

As a result, a negative active material of the present invention includes an inorganic oxide coating layer on the surface, and can thereby minimize interface reactivity between a negative electrode and an electrolyte during the operation of a battery cell, improving charge and discharge efficiency and cycle-life characteristic of a rechargeable lithium battery cell.

EXPERIMENTAL EXAMPLE 3

The rechargeable lithium battery cells including the negative active materials according to the Examples 2 and 4 and Comparative Examples 1 and 2 were charged up to 4.2 V at 0.2 C and discharged up to 3.0 V at 0.2 C. The charge and discharge was 50 times repeated. The results are shown in the FIG. 4. Herein, capacity retention after 50th charge and discharge means the ratio of the 50th charge and discharge capacity verse the first charge and discharge capacity.

Figure 4:
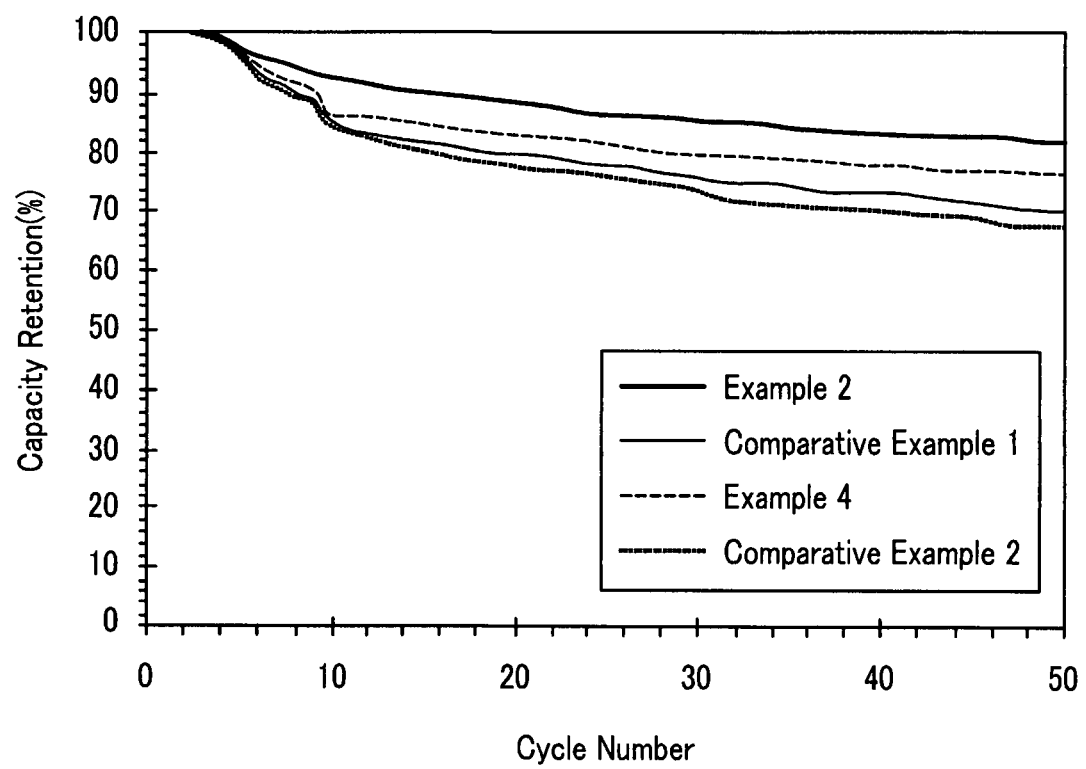
FIG. 4 is a graph showing capacity retention of the cells according to Examples 2 and 4, and Comparative Examples 1 and 2 after 50 charges and discharges.

FIG. 4 is a graph showing capacity retention of the cells of Examples 2 and 4 and Comparative Examples 1 and 2 during 50 charges and discharges.

Referring to FIG. 4, the battery cells according to Examples 2 and 4 of the present invention, which included a negative active material including a coating layer on the surface after 50 charges and discharges, turned out to have a lower decreasing capacity rate than the ones according to Comparative Examples 1 and 2.

Therefore, a negative active material for a rechargeable lithium battery according to the present invention can be applied along with an aqueous binder, and improve high capacity, good cycle-life, and particularly high capacity during charge and discharge at a high rate.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative active material for a rechargeable lithium battery, comprising:
    a core comprising an active material being capable of performing reversible electrochemical oxidation and reduction, the active material selected from the group consisting of a lithium metal, a lithium-containing alloy, and a material being capable of reversibly forming a lithium-containing compound by reacting with lithium ions; and
    a coating layer on the surface of the core, the coating layer having a reticular structure including —O-M-O— wherein M is selected from the group consisting of Si, Ti, Zr, Al, and combinations thereof, and an organic functional group linked to the M as a side chain;
    wherein the organic functional group is a substituted aryl group which is an aryl group substituted by at least one functional group selected from the group consisting of an alkyl group, a haloalkyl group, and combinations thereof.

2. The negative active material of claim 1, wherein the organic functional group is selected from the group consisting of a C6 to C12 aryl group substituted by at least one C1 to C10 alkyl group, a C6 to C12 aryl group substituted by at least one C1 to C10 haloalkyl group, and combinations thereof.

3. A negative active material for a rechargeable lithium battery, comprising:
    a core comprising an active material being capable of performing reversible electrochemical oxidation and reduction, the active material selected from the group consisting of a lithium metal, a lithium-containing alloy, and a material being capable of reversibly forming a lithium-containing compound by reacting with lithium ions; and
    a coating layer on the surface of the core, the coating layer having a reticular structure including —O-M-O— wherein M is selected from the group consisting of Si, Ti, Zr, Al, and combinations thereof, and an organic functional group linked to the M as a side chain;
    wherein the organic functional group is selected from the group consisting of a C6 to C12 aryl group substituted by at least one C1 to C10 alkyl group, a C6 to C12 aryl group substituted by at least one C1 to C10 haloalkyl group, and combinations thereof; and
    wherein the organic functional group is the aryl group selected from the group consisting of benzyl, phenyl, and tolyl.

4. The negative active material of claim 1, wherein the coating layer has a thickness of 20 nm or less.

5. The negative active material of claim 1, wherein the active material is selected from the group consisting of Si, silicon oxide, Sn, tin oxide, a tin alloy composite, a transition element oxide, a lithium metal nitride, lithium vanadium oxide, and a lithium-containing alloy including at least one metal selected from the group consisting of Na, K, Rb, Cs, Fr, Be, Mg, Ca, Sr, Ba, Ra, Al, F, Sn, and combinations thereof.

6. The negative active material of claim 1, wherein the active material is a compound represented by Formula 1:

$$Li_xM'_yV_zO_{2+d} \quad (1)$$

wherein $0.1 \leq x \leq 2.5$, $0 \leq y \leq 0.5$, $0.5 \leq z \leq 1.5$, $0 \leq d \leq 0.5$, and M' of Formula 1 is a metal selected from the group consisting of Al, Cr, Mo, Ti, W, Zr, and combinations thereof.

7. The negative active material of claim 1, wherein the coating layer is comprised of a hydrolysis and condensation product of a compound represented by Formula 2:

$$R_1\text{-M-}(OR_2)_n \quad (2)$$

Wherein M of Formula 2 is selected from the group consisting of Si, Ti, Zr, and Al, RI is the organic functional group, $R_2$ is a C1 to C7 alkyl group, and n is determined according to a valence of the M.

8. A rechargeable lithium battery comprising:
    a negative electrode comprising:
    a negative active material comprising;
    a core comprising an active material being capable of performing reversible electrochemical oxidation and reduction; and
    a coating layer on the surface of the core, the coating layer having a reticular structure including an —O-M-O— linkage surrounding the surface of the core wherein M is selected from the group consisting of Si, Ti, Zr, Al, and combinations thereof, and an organic functional group linked to the M as a side chain;
    a positive electrode comprising a positive active material; and
    an electrolyte;
    wherein the organic functional group is a substituted aryl group which is an aryl group substituted by at least one functional group selected from the group consisting of an alkyl group, a haloalkyl group, and combinations thereof.

9. The rechargeable lithium battery of claim 8, wherein the coating layer has a thickness of 20 mm or less.

10. The rechargeable lithium battery of claim 8, wherein the active material is a material selected from the group consisting of a material being capable of reversibly intercalating and deintercalating lithium ions, a lithium metal, a lithium-containing alloy, a material being capable of reversibly forming a lithium-containing compound by reacting with lithium ions.

11. The rechargeable lithium battery of claim 8, wherein the active material is selected from the group consisting of crystalline carbon; amorphous carbon; Si, silicon oxide, Sn, tin oxide, a tin alloy composite, a transition element oxide, a lithium metal nitride, lithium vanadium oxide, and a lithium-containing alloy including at least one metal selected from the group consisting of Na, K, Rb, Cs, Fr, Be, Mg, Ca, Sr, Ba, Ra, Al, Fe, Sn, and combinations thereof.

12. The rechargeable lithium battery of claim 8, wherein the active material is a compound represented by Formula 1:

$$Li_xM'_yV_zO_{2+d} \qquad (1)$$

wherein $0.1 \leq x \leq 2.5$, $0 \leq y \leq 0.5$, $0.5 \leq z \leq 1.5$, $0 \leq d \leq 0.5$, and M' of Formula 1 is a metal selected from the group consisting of Al, Cr, Mo, Ti, W, Zr, and combinations thereof.

* * * * *